US010182154B2

(12) United States Patent
Pickering

(10) Patent No.: US 10,182,154 B2
(45) Date of Patent: *Jan. 15, 2019

(54) METHOD AND APPARATUS FOR USING A SEARCH ENGINE ADVANTAGEOUSLY WITHIN A CONTACT CENTER SYSTEM

(71) Applicant: NewVoiceMedia, Ltd., Basingstoke, Hampshire (GB)

(72) Inventor: Richard B Pickering, Basingstoke (GB)

(73) Assignee: NEW VOICEMEDIA LTD., Hampshire (GB)

(*) Notice: Subject to any disclaimer, the term of this patent is extended or adjusted under 35 U.S.C. 154(b) by 0 days.

This patent is subject to a terminal disclaimer.

(21) Appl. No.: 15/427,020

(22) Filed: Feb. 7, 2017

(65) Prior Publication Data
US 2017/0149974 A1 May 25, 2017

Related U.S. Application Data

(63) Continuation of application No. 14/810,489, filed on Jul. 28, 2015, now Pat. No. 9,565,311, which is a continuation of application No. 13/226,387, filed on Sep. 6, 2011, now Pat. No. 9,094,515, which is a continuation-in-part of application No. 12/376,269, (Continued)

(51) Int. Cl.
H04M 3/51 (2006.01)
G06Q 30/00 (2012.01)
H04M 3/487 (2006.01)
G06Q 30/02 (2012.01)
G06F 17/30 (2006.01)
G06Q 10/10 (2012.01)
H04M 3/42 (2006.01)

(52) U.S. Cl.
CPC ...... H04M 3/5191 (2013.01); G06F 17/3053 (2013.01); G06F 17/30528 (2013.01); G06F 17/30864 (2013.01); G06F 17/30867 (2013.01); G06Q 10/10 (2013.01); G06Q 30/00 (2013.01); G06Q 30/016 (2013.01); G06Q 30/0256 (2013.01); H04M 3/4878 (2013.01); H04M 3/5183 (2013.01); H04M 3/42068 (2013.01); H04M 3/5141 (2013.01); H04M 2203/407 (2013.01)

(58) Field of Classification Search
USPC .................................................. 379/265.09
See application file for complete search history.

(56) References Cited

U.S. PATENT DOCUMENTS 5,819,251 A * 10/1998 Kremer ............. G06F 17/30595
6,760,727 B1 * 7/2004 Schroeder .............. G06Q 30/02

* cited by examiner

Primary Examiner — Amal Zenati
(74) Attorney, Agent, or Firm — Galvin Patent Law LLC; Brian R. Galvin

(57) ABSTRACT

Apparatus for operating a multimedia contact center, comprising a multimedia contact center system for handling communications sessions between an organization and its customers and obtaining media-specific information relating to the communications session, and a search engine for performing a search in relation to the obtained media-specific information, wherein the multimedia contact center system is configured to use the results from the search in handling the communications session, wherein the results may include heterogeneous material not primarily intended for session handling purposes.

6 Claims, 7 Drawing Sheets

Related U.S. Application Data filed as application No. PCT/GB2007/001398 on Aug. 4, 2006, now Pat. No. 9,277,054.

METHOD AND APPARATUS FOR USING A SEARCH ENGINE ADVANTAGEOUSLY WITHIN A CONTACT CENTER SYSTEM

CROSS-REFERENCE TO RELATED APPLICATIONS

This application is a continuation of U.S. patent application Ser. No. 14/810,489, titled "METHOD AND APPARATUS FOR USING A SEARCH ENGINE ADVANTAGEOUSLY WITHIN A CONTACT CENTER SYSTEM", filed on Jul. 28, 2015, which is a continuation of U.S. patent application Ser. No. 13/226,387, titled "METHOD AND APPARATUS FOR USING A SEARCH ENGINE ADVANTAGEOUSLY WITHIN A CONTACT CENTER SYSTEM", filed on Sep. 6, 2011, now issued as U.S. Pat. No. 9,094,515 on Jul. 28, 2015, which is a continuation-in-part of U.S. patent application Ser. No. 12/376,269, titled "APPARATUS AND METHOD FOR INTEGRATING COMPUTER-TELEPHONY AND SEARCH TECHNOLOGY", filed on Mar. 22, 2010, now issued as U.S. Pat. No. 9,277,054 on Mar. 1, 2016, which is the national stage entry of and claims priority to PCT application Ser. No. PCT/GB2007/001398, with the same title, filed on Aug. 4, 2006. The disclosure of each of the above-referenced patent applications is hereby incorporated by reference in its entirety.

BACKGROUND OF THE INVENTION

Field of the Invention

The invention relates to the integration of computer-telephony and search technology.

Discussion of the State of the Art

FIG. 1 is an illustration of a conventional computer-telephony integration 15 (CTI) system. An incoming call 60 is received by a switch 90. The switch passes information about the call to a CTI server 80. The information passed may include, for example, a calling line identification (CLI), sometimes known as automatic number identification (ANI), and/or a dialed number identification. Switch 90 is also provided with an interactive voice response (IVR) unit 95 which may be used to obtain additional information from the caller, for example an account number or such like. This additional information may also be passed to CTI server 80. In some implementations, various messages may be played to the caller as part of the initial call handling, for example to allow a caller to specify the type of desired action, for example to make a new booking, amend a previous booking, or some other query. Caller input 25 in response to this information can then be used subsequently in determining how to handle the call.

Switch 90 routes the call through telephone network 101 to a telephone 121 belonging to an agent 120. For example, switch 90 may route a particular incoming call 60 to agent 120B having telephone 121B. CTI server 80 may instruct switch 90 which particular agent to forward the incoming call to. In other implementations, switch 90 may make this decision through some other mechanism, such as agent availability (and notify CTI server 80 accordingly).

In addition to telephone 121, each agent 120 is also provided with a workstation 122. CTI server 80 has access to a customer relationship management (CRM) database 70. CTI server 80 can use information about a particular call provided by switch 90 to look up information relating to the caller in CRM database 70. For example, this information may represent a name and address of a party associated with a particular calling line identification, as well as any information about previous orders that this person may have made, and so on. CTI server 80 can then provide this information to workstation 122 associated with agent 120 who receives the call in order to assist the agent in handling the caller. For example if the incoming call 60 is to be routed to telephone 121B of agent 120B, then CTI server accesses information about the caller from CRM database 70 and forwards this information to corresponding workstation 122B.

If no agent is free to handle incoming call 60, switch 90 may put the caller in a queue. While the caller is in a queue, switch 90 may provide the caller with marketing messages, information about queue status, and so on. These messages may be sourced from IVR 95 or switch 90 themselves.

In some circumstances, a call may be handled automatically without having to reach an agent 120. For example, a caller may ring to obtain an account balance. IVR system 95 may be able to obtain the account number from the caller, perform appropriate security checks (for example, accepting an input PIN), access one or more account balances from a server 201 via a link (not shown) between IVR 95 and computer network 102, and then provide relevant balances to the caller, for example by using text-to-speech systems well-known in the art.

Call centers having CTI such as shown in FIG. 1 have been around for many years. In many cases systems such as the one shown in FIG. 1 are internal to a particular organization. In other words, switch 90 represents a PBX and telephone network 101 represents an internal telephone network of the organization. Likewise computer network 102 represents an internal computer network (such as an intranet) of the organization.

An alternative configuration, sometimes referred to as SPE (service provider equipment) involves locating CTI server 80 within a general telephone network, with switch 90 being a central office switch or other network-resident switch that forms part of an overall network run by a carrier. In this configuration, telephone network 101 may be a public switch telephone network (PSTN) and computer network 102 may be the Internet. There may be additional equipment (not shown in FIG. 1) to link workstations 122 to computer network 102 and/or telephones 121 to telephone network 101. For example, workstations 122 may be attached to an internal network, such as an Ethernet, which is then linked to computer network 102 by a router and firewall (for example; other network architectures are common in the art), while telephones 121 may be linked to telephone network 101 by an automatic call distribution (ACD) unit.

There are some drawbacks associated with the architecture of FIG. 1. For example, CTI server 80 may be relatively expensive. In addition, it is necessary to provide CTI server 80 with access to CRM database 70. Generally this requires CTI server 80 to be able to submit queries to CRM database 70 and to be able to understand the responses, for example by providing CTI server 80 with access to a database application programming interface (API) supported by CRM database 70. In practice, many smaller call centers do not have a CTI server 80; rather workstations 122 typically access CRM database 70 directly, without using (or benefiting from) any telephony information acquired by switch 90.

WO 00/54485 discloses a system for administering call set-up in a telecommunications network. A web page stores call handling data for a caller in extensible markup language (XML) or some other predetermined format. Such a web page typically contains an identifier and title, a policy type and owner, and various rules. Upon connection of a call to a switch 90, information associated with a call is converted to keywords for a search engine to locate a web page corresponding to (or at least relevant to) the initiating caller, thereby allowing the call to be handled accordingly.

It is common for organizations to outsource CTI and/or call center operations to one or more third parties. This strategy may be adopted by very small organizations, which may only have one incoming telephone line, as well as by larger organizations. In some cases third parties may provide CTI services to assist the organization in handling calls itself, while in other cases third parties may be responsible for complete handling of calls (i.e. the original organization is not involved at all in handling calls).

One problem with third party call center models concerns provision of access for CTI service provider (i.e. the third party) to CRM database 70 of a client (i.e. an organization on whose behalf the hosted telephony service is being provided). For example, a client may provide CTI server 80 with its own copy of CRM database 70, but this copy may not always be up to date. In addition, CTI server 80 may now have to support access to potentially multiple different CRM database 70 formats for multiple different clients, adding significantly to cost and complexity of CTI server 80. Furthermore certain CRM data may be unavailable to service provider, which may in turn limit the functionality that CTI server 80 can provide.

Another difficulty is that smaller organizations may not have the capacity to maintain a proper CRM database 70. This has generally meant that such small clients have not been able to benefit from full CTI services.

SUMMARY OF THE INVENTION

Accordingly, one preferred embodiment of the invention provides a method of operating a multimedia contact center. The method involves initiating or receiving a communications session in one of a plurality of communications media, obtaining media-specific information relating to the communications session, performing a search with a search engine in relation to the obtained media-specific information, and using results from the search in handling the session. The search results include heterogeneous material not primarily intended for session handling purposes.

According to one embodiment of the invention, the search has a domain of a single computing device. According to an alternative embodiment of the invention, the search has a domain of a plurality of data-containing devices associated with a single user or group of users. According to yet another alternative embodiment, the search has a domain of material held within an organization. In yet another embodiment, the search engine is an enterprise search engine that performs a search across multiple servers of the organization. In another embodiment, the search is performed across the Internet.

According to various embodiments of the invention, communications sessions are directed to one or more users each associated with a single computing device based at least in part on the search results. In yet further embodiments, the heterogeneous collection of materials comprises one or more of emails, web pages, and word processing documents. In some embodiments the search results are used to provide information to at least one participant of the communications session. In another embodiment, the search results are used to determine an advertisement to be delivered via the communications session to at least one participant of the communications session.

In a preferred embodiment, the search engine uses a party's media-specific address as a search string. In another preferred embodiment, the search results are used for determining an operation to be performed on the communications session. In some embodiments, at least two searches are performed using data from a single communications session. In a preferred embodiment, the method further comprises parsing the search results to determine how to handle the communications session. In yet a further embodiment, the parsing comprises looking for one or more data items having a predetermined structure in the search material, and does not require the search material to have a predetermined format. In some embodiments the search results are used to provide map information.

In another preferred embodiment of the invention, an apparatus for operating a multimedia contact center is disclosed, comprising a multimedia contact center system for handling communications sessions between an organization and its customers and obtaining media-specific information relating to the communications session, and a search engine for performing a search in relation to the obtained media-specific information. According to the embodiment, the multimedia contact center is configured to use the results from the search in handling a communications session, and the results may include heterogeneous material not primarily intended for session handling purposes.

In yet another preferred embodiment of the invention, a method for operating a multimedia contact center is disclosed, comprising the steps of: (a) initiating a communications session targeted at a specific consumer, (b) providing information relating to the communications session, (c) performing a search with a search engine in relation to the provided information, and (d) using results from the search in handling the session, wherein the results may include heterogeneous material not primarily intended for call handling purposes. According to yet another embodiment of the invention, the provided information comprises an identity of the target of the communications session.

It will be appreciated that the apparatus embodiment of the invention may benefit from the same preferred features as the method embodiment of the invention.

The present invention also provides a computer program for implementing a method as described above, and a computer readable medium, such as a DVD, flash memory, or hard disk, containing such a program.

BRIEF DESCRIPTION OF THE DRAWING FIGURES

Various embodiments of the invention will now be described in detail by way of example only with reference to the following drawings.

DETAILED DESCRIPTION

Figure 2:
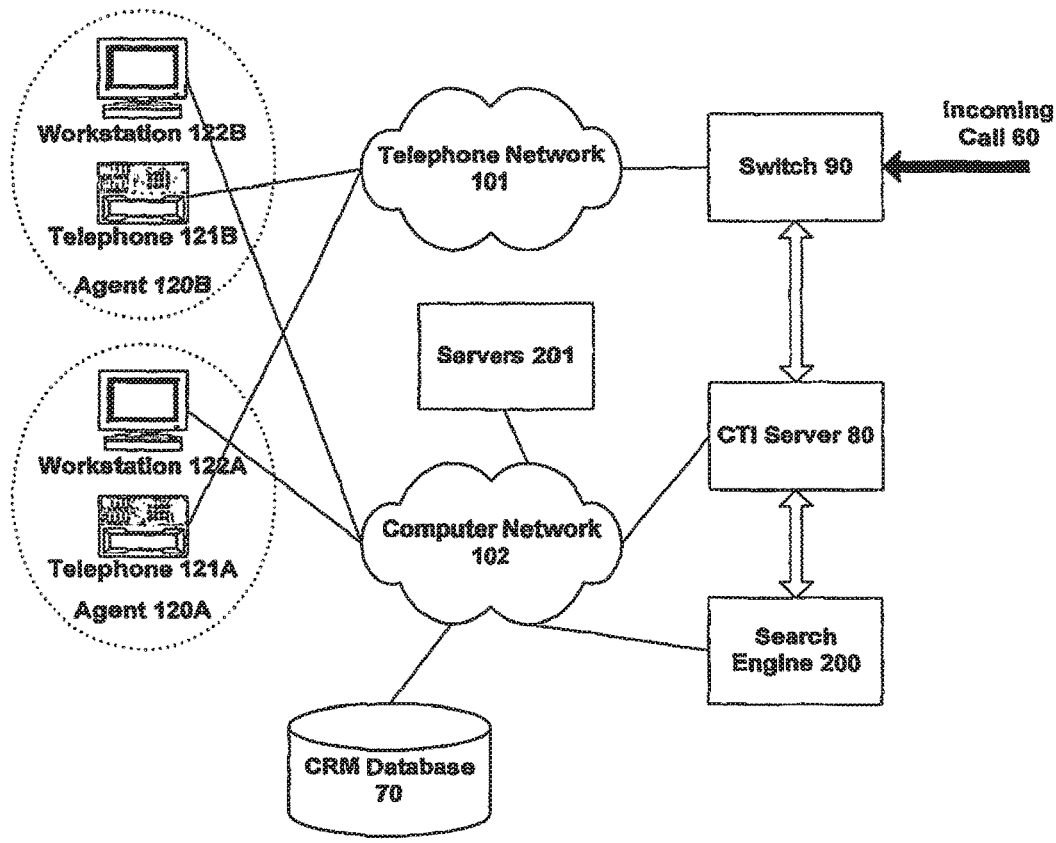
FIG. 2 is a schematic diagram of a CTI system in accordance with one embodiment of the invention.

FIG. 2 is an illustration of a CTI system in accordance with a preferred embodiment of the present invention.

Figure 1:
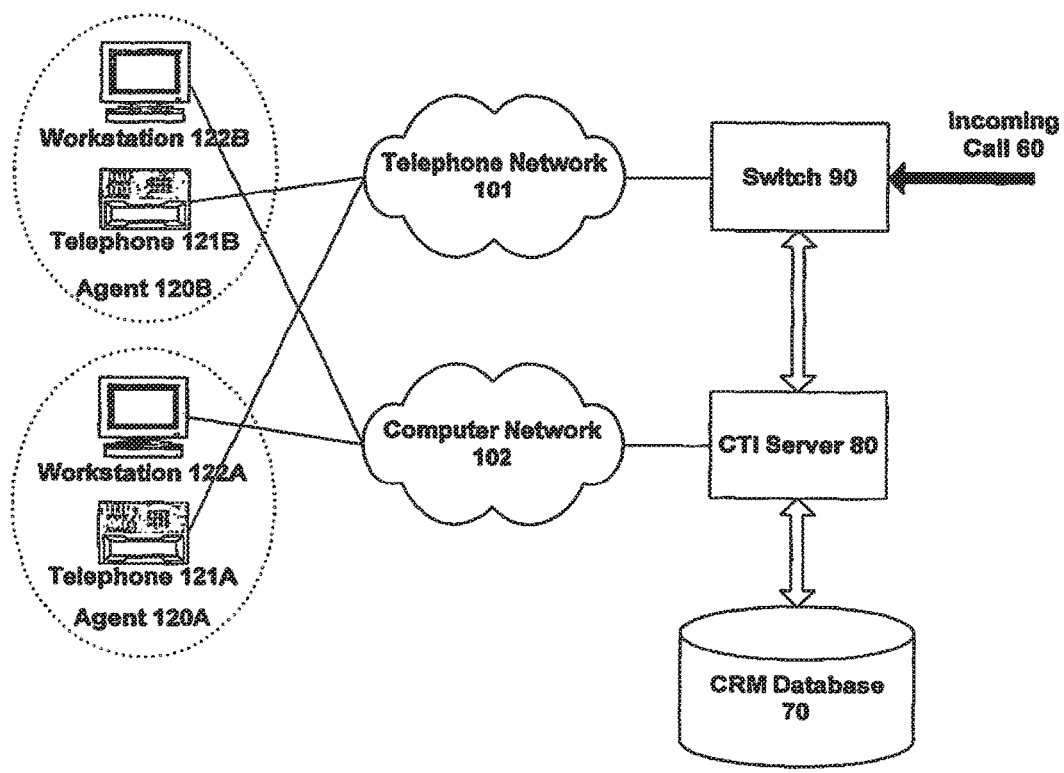
FIG. 1 is a schematic diagram of a known CTI system.

Components that are the same as existing systems such as shown in FIG. 1 will not be described further. In the system of FIG. 2, CTI server 80 no longer accesses CRM database 70 directly; indeed, in some implementations CRM database 70 may be omitted altogether. Instead, CTI server 80 is linked to a search engine 200 such as Google™ enterprise server (or any other appropriate form of search engine). Search engine 200 has access across computer network 102 to potentially many different servers 201 within an organization, for example email servers and so on. Search engine 200 may also be connected to third party servers and content sources, such as web servers, accessible over the Internet or other publicly available networks.

Search engine 200 may also be able to access CRM database 70 (if present), or alternatively CTI server 80 may itself directly access CRM database 70 (as shown in FIG. 1).

Figure 3:
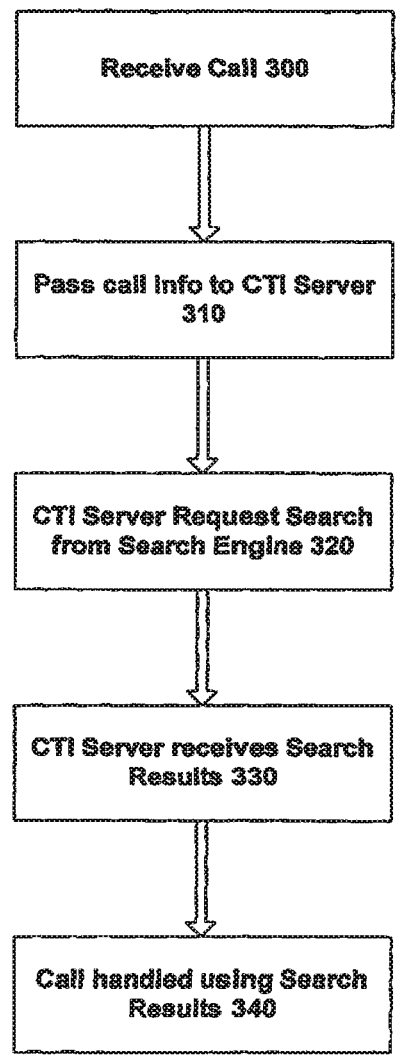
FIG. 3 is a flowchart of a method for operating the CTI system of FIG. 2 in accordance with one embodiment of the invention.

FIG. 3 is a flowchart showing in schematic form the operation of a system such as that shown in FIG. 2, in accordance with a preferred embodiment of the invention. An incoming call is received (300). Information concerning the call is passed to CTI server 80 from switch 90 (310), as already described in relation to FIG. 1. Most commonly call information is obtained automatically by switch 90, and for example comprises calling and/or called numbers. In some implementations, this call information may be supplemented by information specifically acquired from a caller, for example using an interactive voice response (IVR) system (not shown in FIG. 2).

CTI server 80 now sends a request to search engine 200 based on received CTI information (320) (rather than CTI server 80 itself performing a database lookup as in the operation of the system in FIG. 1). When CTI server 80 receives search results back from search engine 200 (330), CTI server 80 can use the received search results to perform appropriate call handling (340). This call handling may for example involve directing a call to a particular agent and his/her telephone 121 based on the search results and/or providing information from search results as a screen pop or similar onto a workstation of an agent who is about to receive the call.

Although the processing of FIG. 3 is depicted as a simple sequence of steps, more complicated scenarios are possible. For example, CTI server 80 may initially try to obtain information itself from CRM database 70, as for FIG. 1. In this case CTI server 80 might only make a search request at operation 330 if the information available from CRM database 70 is insufficient for call handling. For example, if an incoming calling number is not present in CRM database 70, CTI server 80 may request search engine 200 to locate the telephone number, for example by searching over a set of web pages or a set of emails. If CTI server 80 can then find a name associated with the telephone number (either for an individual or a company), CTI server 80 may then return to CRM database 70 to try to find this name in CRM database 70 in order to obtain further information that may be pertinent for call handling.

Another possibility is that if information obtained by CTI server 80 is regarded as insufficient for call handling purposes, CTI server 80 may ask switch 90 (or other relevant apparatus) to acquire further information from the caller, for example using an IVR as mentioned above. This further information may then be used as the basis for (another) search conducted by search engine 200.

It will be appreciated therefore that there are multiple different routes for CTI server 80 to acquire information, for example from an IVR, a CRM database 70, and/or one or more search engines 200. Depending on particular applications and circumstances, CTI server 80 may exercise these different routes sequentially or in parallel (or via some combination of the two), iteratively, conditionally, and so on. For example, information about a caller retrieved from CRM database 70 might be used as the basis for a search by search engine 200; conversely, information found from a search might be used to help identify a caller record in CRM database 70.

In contrast to the configuration of FIG. 1, where CTI server 80 performs a database lookup for a specific, formatted record for the caller, or indeed the approach of WO 2005/017773, in which a search engine locates a specific formatted web page for a caller, search engine 200 of FIG. 2 adopts a very different approach. In particular, search engine 200 is not trying to locate predetermined call handling data stored in a single formatted record or web page. Rather, based on call details such as calling number, search engine 200 retrieves information of potential relevance to call handling across the search domain.

The retrieved information may be distributed across multiple documents forming a heterogeneous collection of generic material, such as emails, web sites, internal company documents (for example, Word files, spreadsheets, and the like), and so on. Note that this material was not originally intended, designed or created for CTI call handling purposes, and so does not directly instruct CTI server 80 how to process a call; rather CTI server 80 (or another system) has to infer how to process a call from an analysis of material retrieved by a search.

Search engine 200 has access to a potentially much wider range of data than conventional CTI systems such as that shown in FIG. 1 (which is limited to the contents of CRM database 70). For example, a CRM database 70 may only contain information about existing customers, whereas search engine 200 can look for information about callers who are not currently customers (and hence might represent potential new customers). Search engine 200 can also retrieve a much broader range of material that would normally be stored in CRM database 70, for example emails that a customer has previously sent into an organization. This information can greatly improve handling of the call.

Furthermore, search engines are widely deployed for general information retrieval. Consequently, a search engine such as shown in FIG. 2 can be readily obtained by an organization (if not already available within the organization), and moreover can be installed and maintained by general IT staff, without requiring specialist skills in CTI or CRM database technology. In addition, search engine 200 generally accepts input search strings in the format of basic text (this can be regarded as a very simple and standardized form of API). Thus in some embodiments, CTI server 80 avoids having to support formalized database queries into CRM database 70, which therefore reduces the burden and complexity of CTI server 80. Accordingly, upfront and running costs of configurations like that of FIG. 2 are very competitive.

It will be appreciated that in many cases the search engine 200 performs a continuous (or regular) process of searching servers 201, etc. Search engine 200 indexes and/or caches results of ongoing searching for use in responding to future search requests. Thus in response to a request from CTI server 80 at operation 320, search engine 200 may already have results available based on the index information and/or cached data, rather than having to perform a new search of servers 201 in response to each incoming request. Results may be returned to CTI server 80 either as the materials themselves or as links to the relevant materials (e.g. URLs).

Note that indexing (and potentially advanced caching) may be customized for CTI integration. For example, indexing may be performed by telephone number. Additional searching could also be performed in advance. For example, the system could search for any telephone numbers in internal documents of an organization. For each telephone number located, it could look at which employee name is associated most frequently (or most recently) with each telephone number. This then gives a mapping of telephone numbers to employees, which can be used for the routing of future incoming calls.

Figure 4:
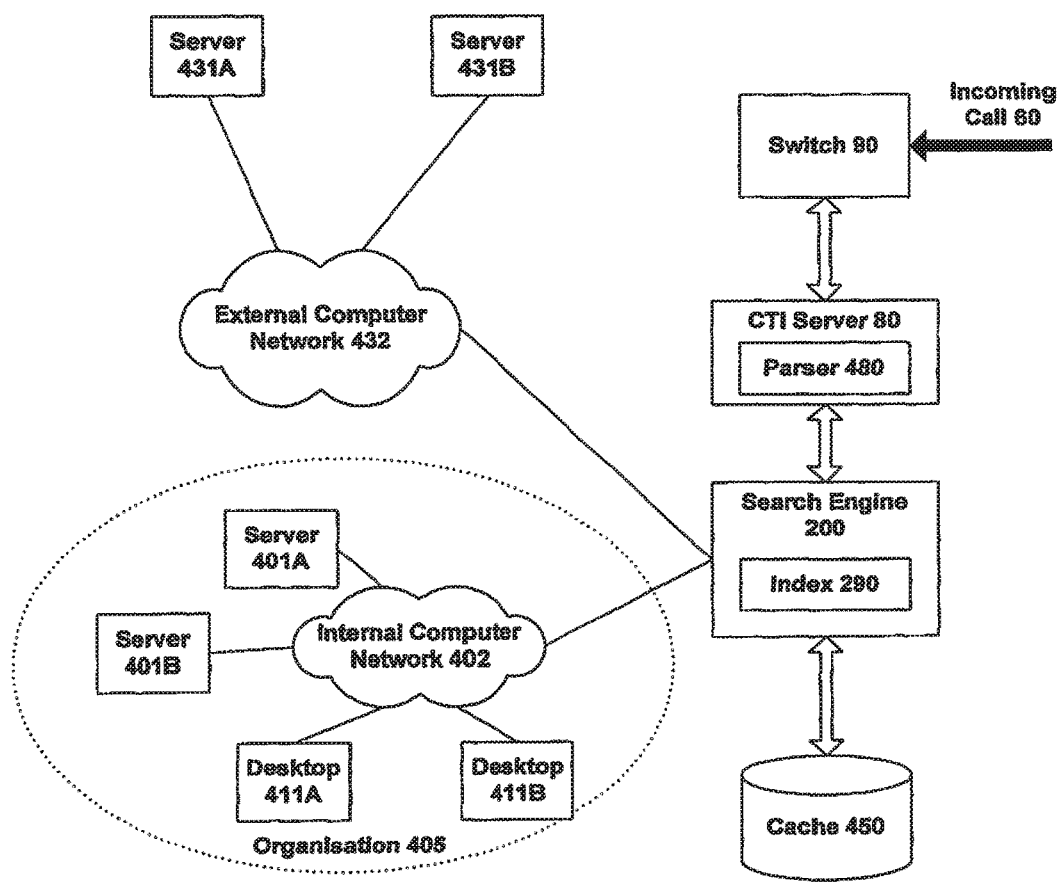
FIG. 4 is a schematic diagram indicating the potential search domain for use in the embodiment of FIG. 2.

FIG. 4 is a schematic illustration of a system architecture with computer-telephony integration and a search engine 200 in accordance with one embodiment of the invention. Note that FIG. 4 is intended to focus on different aspects of the architecture from FIG. 2; the embodiment of FIG. 4 can therefore be seen as complementary (rather than an alternative) to the embodiment of FIG. 2. In particular, FIG. 4 is primarily concerned with operations and interactions of search engine 200, and hence for clarity omits some telephony components that are shown (for example) in FIG. 2.

Thus as shown in FIG. 4, search engine 200 is connected to both an internal computer network 402 (intranet) for an organization 405 and also to an external computer network 432 (extranet or the internet). Note that while switch 90, CTI server 80, search engine 200 and cache 450 are shown as external to organization 405, one or more of these components may be internal to the organization, depending upon the particular implementation adopted. For example, in some implementations, search engine 200 may be an internal search engine run by a particular organization, while in other implementations, it may be a general search engine 200 accessed over the Internet (such as www.google.com).

Information that might be searched by search engine 200 over network 432 comprises, for example, the following:

General material publicly available on the web, including pages for individuals (private and business), companies, and other organizations;

Reference material publicly available on the web, including official sites, such as http://www.companieshouse.gov.uk, which provides basic information for all companies registered in the UK, along with other directories;

Restricted material available from an information supplier such as Dun and Bradstreet over a public network; and Restricted material available over a public network to members of a particular grouping, e.g. an industry trade body, or a social or professional network such as LinkedIn™

Restricted material may be subject to possible payment, subscription, registration, password, and other restrictions, which can be provided to search engine 200 for access.

Information that might be searched by search engine 200 over network 402 comprises for example the following:

Information on individual desktop machines 411, including word processor files, presentations, spreadsheets and emails; and Information on servers 401, including intranet files, emails, document management systems, backup and archived material, database files, and the like.

It will be appreciated that search domains (that is, ranges of content sources accessed in response to search requests) used by search engine 200 may be different for different implementations. For example, in some implementations, search engine 200 may only search computers within organization 405, and not look for information over any external network. In addition, search domains may be specific for a particular call. For example, an incoming call may have a direct dial number to an extension of a particular user. Search engine 200 may then search one or more desktop and laptop machines 411 associated with that particular user to find information for handling the call.

In the embodiment of FIG. 4, search engine 200 has an associated index 290 and cache 450. These can be used in conventional fashion to assist the operations of search engine 200. Thus index 290 maps search terms to material containing those terms to provide fast search retrieval, while cache 450 contains copies of at least some material accessible to search engine 200. It will be appreciated that both cache 450 and index 290 are generally populated by performing ongoing searches using a spider or similar tool, thereby ensuring that results are rapidly available for newly received searches.

CTI server 80 of FIG. 4 includes a parser 480 (note that in some embodiments parser 480 may be a separate machine, or part of search engine 200). The role of parser 480 is to automatically extract useful information from material retrieved by search engine 200. For example, if a search string is based on a calling telephone number of an incoming call, parser 480 can try to identify a post (zip) code in a set of documents found by search engine 200. This identification may take into consideration factors such as the known format of a post (zip) code, the proximity of a post code in a retrieved document to the calling telephone number, a quantity of retrieved documents that contain the same post code associated with a particular calling telephone number and so on. (Although there are commercially available databases that map calling line ID to postcode, these are not always complete, and do not assist with non-geographic numbers such as mobile phone numbers). Note that parser 480 may also be operated on a continuous basis across a search domain of search engine 200, with corresponding results stored (cached), so that results are rapidly available for an incoming call.

As a specific example of the above processing, an organization may receive a call from a mobile telephone (or other non-geographic number). The mobile telephone might be used by a person running a home business with a web site that lists both the mobile telephone number and the address of the business. Parser 480 can then extract the postcode from this web site and use this information to determine how best to handle the call. For example, the call might be directed for handling to a particular branch office of the organization that is located near the caller's business address, or an agent handling the call may be prompted with information concerning the store nearest to the assumed location of the caller.

Figure 5:
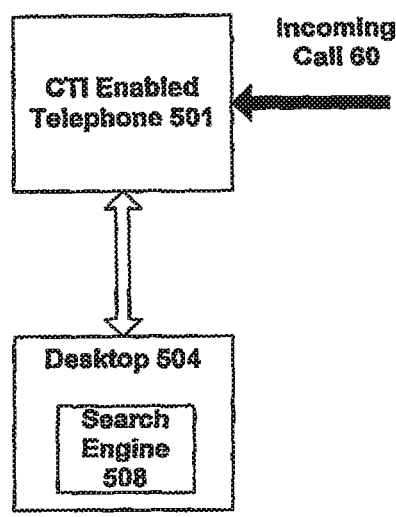
FIG. 5 is a schematic diagram of a CTI system in accordance with another embodiment of the invention.

FIG. 5 illustrates another embodiment of the invention in which a user or agent is provided with a desktop 504 system (e.g. a personal computer) that includes a search engine 508, such as Google™ desktop or some other similar system. The user of the system of FIG. 4 is also provided with a CTI enabled telephone 501, in other words, a telephone that can notify a linked PC (i.e. desktop 504) that the telephone has received an incoming call and can provide some pertinent information about the call (such as a calling line identifier). Note that in other embodiments, a user may have a conventional telephone, and desktop 504 then receives CTI information from a CTI server 80 using an architecture similar to that shown in FIGS. 1 and 2.

Information received from CTI-enabled telephone 501 is used to form a search query that is then entered into search engine 508. The scope of this search depends on the configuration of search engine 508. For example, the search may be limited to files on desktop 504, or may extend to various network services accessible to desktop 504 (for example, a file and/or email server).

As an example of the operation of the system of FIG. 5, desktop system 504 may receive from telephone 501 a telephone number of a caller associated with an incoming call 60. This telephone number is then entered as a search string into search engine 508, which searches a variety of data, such as saved documents, emails, spreadsheets, and so forth, for this string (as explained in relation to FIG. 3, this search may be performed in direct response to a request, or it may alternatively utilize index and/or cached materials from previous searching). For example, this search may identify one or more emails containing this telephone number, which may well have been received from the person making the call. Accordingly, results from search engine 508 contain links to these emails and any other materials that match the search string. The search results including associated links can then be displayed to the person receiving the call, thereby allowing relevant materials to be readily accessed in order to assist handling the incoming call 60.

It will be appreciated that the approach of FIG. 5 is extremely flexible and powerful. In addition, it can be readily used by very small organizations, since the only additional functionality involved (for a person who already uses Google™ desktop or similar) is to receive CTI information from telephone 501 and to enter this information into search engine 508, with results from the resulting search then being displayed automatically to the user. Accordingly, the embodiment of FIG. 5 provides a very flexible and low-cost introduction of CTI facilities.

The desktop configuration of FIG. 5 can also be applied to larger systems with many agents (as shown in FIG. 2), where each workstation 122 may be provided with its own search engine (rather than having a single shared search engine such as shown in FIG. 2). In this distributed approach, when the switch forwards an incoming call to a telephone of a selected agent, it also provides the corresponding workstation 504 with needed information for forming the search query. Such an architecture provides CTI information despite only very limited support from switch 90 (switch 90 may do no more than forward basic call information to a workstation 504 associated with a telephone that is to receive the call).

One possible situation is where switch 90 supports direct dial to different telephone extensions 121A, 121B. In this case, the search domain may be limited to (or start with) material associated with the particular user corresponding to the dialed extension. This material may comprise, for example, files stored on a computer associated with that user, and/or files owned by that user and stored centrally.

The configuration of FIG. 5 may also be readily adopted in respect of Internet telephone systems such as Skype™, Vonage™, or other systems that adhere to a protocol such as the session initiation protocol (SIP) for voice over Internet (VOIP) calls (see http://www.voip-info.org/wiki for more details of Internet telephone systems). In such a configuration, incoming call 60 is received in effect directly into desktop machine 504 over the Internet or other computer network (rather than being received over a dedicated telephony network such as a PSTN). Accordingly, desktop machine 504 has immediate access to information about the call for use in formulating a search query for search engine 508. Note that if an incoming call is received from a VOIP system (whether into another VOIP system or a conventional telephone network), then the information about that call may be somewhat different from that available for an incoming call over the conventional PSTN. For example, the call information might represent a name, user id, network address, and so on. Nevertheless, this call information can still be used as a basis for a search query to obtain additional information for call handling purposes.

It will be appreciated from the various embodiments so far described that the present invention can be adopted in a wide variety of configurations. For example, search technology may be integrated into ACD systems including call centers, whether network-based (SPE) or customer-based (CPE), carrier network operations (landline, mobile, Internet, etc.), systems based on desktop machines (such as shown in FIG. 5), whether in standalone mode or connected to a remote CTI system. Search engine 200/508 and search domain can be adjusted to each particular configuration and application. For example, search engine 200/508 may be based on any type of system, from a desktop machine (such as shown in FIG. 5) through to a high-powered server (or cluster of servers), depending on the number of calls to be handled. Likewise, search domain may represent a single computer, a single computer network (for example, a local area network), an enterprise network, or a public network, such as the Internet, etc.

Results of searches carried out in accordance with the invention can be used to control one or more different aspects of call handling. Such aspects may include direct treatment of a call, such as determining a priority given to the call, determining to whom a call to be forwarded, how to process a call if the intended recipient is not available, and so on.

Results of searches can also be provided, for example, as a screen pop delivered to a person involved in handling the call, such as a receptionist (who may then route the call with or without first answering the call), an agent who receives the call, or any other person who handles the call. Search results can also be used to determine whether a call is directed to an automated IVR system to acquire and/or play additional information from/to a caller, as well as to specify a caller treatment to be carried out by an IVR, for example by determining what menus to offer a caller.

In one embodiment, search results may be used to deliver advertising or marketing content to a caller. For example, a wholesaler for automobile parts may receive a call, and search information based on caller information indicates that the caller is a tire fitter. The caller may then be played an advertisement for a particular brand of tire before (that is, while waiting for) connection to a service operative of the wholesaler. If the caller is calling from a mobile telephone (or an Internet telephone), the advertisement may also (or alternatively) be sent directly to the caller, for example, as a screen pop, and the content of the advertisement may at least in part be determined by location information obtained from the mobile device used by the caller. Advertising in this manner can provide revenue to the wholesaler and/or to the provider of telephony services for the wholesaler.

The telephony information in a search request (to search engine 200 or 508) may comprise the calling line identification, the dialed number identification, or perhaps other information entered by a caller into an IVR system, such as account number etc. This information can be supplemented in a search request by other wording to improve search results. There are many possibilities for this additional wording, such as, for example, specifying a search for telephony information+a term such as "name" or "address" (this may increase the chances of pulling up additional useful information such as name and/or address relating to the caller. An agent handling a call may then be able to confirm that a retrieved name and/or address is correct for the caller, and may then be able to transfer this information into CRM database 70 (if not already present). Note that this is a much more caller-friendly and less error-prone process than having to acquire the address from the caller himself/ herself for entry into computer systems of the organization. Another example is to search for telephony information plus names of individuals within an organization. For example, if the telephony information is found in combination with a name plus a title of "managing director" or "CEO" this may indicate a more important caller. Additional examples include: search for telephony information plus particular promotion names—e.g. gold 30 customer, since this may also affect how the call is handled; and search for telephony information plus a term such as "sales" where subsequent processing might test any numerical values returned to try to assess the importance of the customer.

Note that in some cases the additional search terminology may be dependent on the telephony information. For example, the name of the town corresponding to the area code of the incoming call may be used to search for an address—e.g. if an incoming call is from a UK area code of 02380, it may be appropriate to include "Southampton" in the search terms.

The number of hits for a given search combination may also be significant for deciding how to handle an incoming call. For example, the more times that the name of the CEO is found in conjunction with the caller information, the more important the caller is assumed to be and the higher the call priority (e.g. it may be directed to a more senior person). In addition, the search request may represent multiple individual searches, which may be performed in parallel or in succession. In the latter case, the later searches may be conditional or dependent on results of earlier searches. For example, multiple searches could be performed in parallel, each combining available telephone information with a name of a different person in an organization to see who is most appropriate to answer the call (e.g. based on which combination gets most hits). Another possibility would be to perform a first search to find a company name associated with a calling telephone number. A second search might then be performed to locate information associated with that company, such as a financial reports, news items, etc.

In one embodiment CTI server 80 passes raw search results to a person (for example, a call center agent) handling the call as information potentially relevant to the call. This completely avoids CTI server's 80 having to be able to interpret (parse) search results, which can significantly simplify the complexity of deploying a system according to the invention.

In another embodiment, CTI server 80 may utilize search results itself, for example in determining how to route a call, for example by performing a search in combination with one or more names, as discussed above. In this embodiment, CTI server 80 (or some other system such as parser 480) processes search results from search engine 200. This capability to the search results may involve counting a number of hits, or may include some ability to interpret, semantically or otherwise, any received data, for example to detect a name or address in the text.

As previously mentioned, input to search engine 200 is generally in a simple text format. Likewise, the results from the search engine are generally presented in a standard format of links (e.g. URLs or URIs) to relevant material, or as complete documents or shortened previews of documents. Thus unlike with CRM database 70, where every organization may have its own database format, the results from search engine 200 are generally presented in a much more consistent format. This avoids (for example) a CTI supplier having to write a different front end to parser 480 for each different organization.

Note that although links (URIs) are generally presented as standard text strings, they may link to any form of content such as audio, images, video, etc. In some cases, search engine 200 may locate this material based on ancillary data (metadata), such as file name, etc. In other cases search engine 200 may be able to work directly with different forms of content, such as performing speech recognition on audio data. (There is also, for example, much ongoing research concerning the automatic classification of images). As an example of this approach, a call center for a clothing retailer may try to access an image of a caller, for example by locating a facial or body image on a web page that also contains the name of the caller. This might then suggest an age and general build or size of the caller, which might in turn indicate the type of clothing products of most interest to them. The accuracy of this approach could be enhanced by comparing images from a plurality of different web sites containing the caller's name (for example, the caller's LINKEDIN™ professional profile, his TWITTER™ profile, and his FACEBOOK™ page) and looking for a match.

The following illustrates a set of results from a search based on a calling number, 02380719500, on the site www-.google.co.uk:

D Young & Co in Southampton—Unclassified in Southampton—
Touch: D Young & Co. User reviews (0) 02380719500 Briton House 10-12 Briton Street, Southampton, Hampshire, S014 3EB.
Try other:, Unclassified in Southampton . . .
www.touchsouthampton.com/business/list/bid/ 4240074—39k—
Supplemental Result13 Cached—Similar pages 123Banq.com D Young & Co. Patent Agents. Address: 10-12, Briton House, Briton Street, Southampton, S014 3EB, UK Telephone: 02380719500 . . .
www.123bang.com/ localsearch.php?m=1&tid=64&cid=2831—12k—
Supplemental Result—Cached—Similar pages If an organization such as a bank receives a call from this number, an agent who receives the call can immediately identify the name of the caller, the address of the caller, and also the business of the caller from the search results. The search could be extended further by using the company name (readily identified automatically at the start of the above two entries) as another search string, which yields the following on www.google.co.uk:

D Young & Co UK European patent attorneys
D Young & Co. Chartered, registered attorney for patents, trademarks, patents, trademarks, design, community trademark . . . www.dyoung.com/—11k—Cached—Similar pages This is the main web site for D Young & Co and provides the agent with ready access to further information about the caller.

Figure 6:
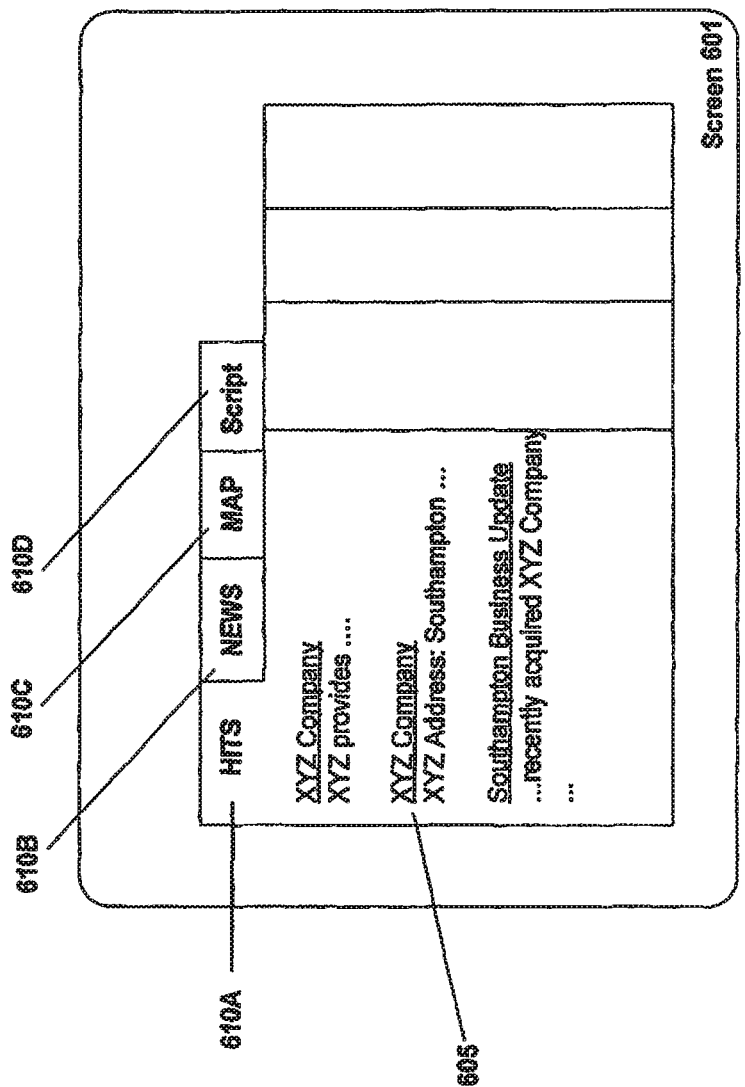
FIG. 6 is a schematic illustration of an agent screen produced by the CTI system of FIG. 2 in accordance with one embodiment of the invention.

FIG. 6 illustrates a screen 601 provided to an agent who receives an incoming telephone call in accordance with an embodiment of the invention. Screen 601 includes various tabs 610A, 610B, etc., each providing different information to the agent. Clicking on a particular tab brings information associated with that tab to the foreground. It will be appreciated that the tabs shown in FIG. 6 are by way of illustration only, and other implementations may have different tabs (or some other form of user interface).

Tab 610D shown in FIG. 6 provides a script for an agent to use in handling a call (such scripts are conventional in call center applications). The remaining tabs provide additional material which may be obtained from searches based on caller information in accordance with various embodiments of the invention. This additional material may help an agent to interact with a calling party at a more individual, and hence generally more successful, level. In FIG. 6, tab 610A is currently in the foreground and provides a listing of 605 search results (hits) obtained using caller information as a search query (similar to that shown above).

Note that if there are too many hits for display within a single screen, a facility can be provided to scroll or page down to additional hits in conventional fashion. In this particular embodiment, hits are presented as live links, so that by clicking on a desired search result, the user is taken directly to the corresponding material. (In some cases a user may be presented with a choice of going to the original material or a cached version for speed). Tab 610B provides a similar listing to tab 610A, but is limited to news items. This corresponds to a service available on certain search engines, such as Google, in which a search domain is limited to news material (rather than all material available on the web). Search engines may offer other limited search domains that might be presented on other tabs. For example, Google offers the "Froogle" service, in which the search domain is limited to advertisers. Tab 610C takes a location and plots a map for this location using Google maps or any other available mapping tool. The location can be determined by parsing search data such as shown in in the second search result above for D Young & Co., to for example extract a post (zip) code. Alternatively, a location might be obtained using existing data sets for directly converting telephone numbers to locations. The map may be augmented with information pertinent to a person handling the call. For example, if a call is received at a pizza outlet, the map may indicate a delivery area for the outlet, or if a call is received at a council education office, the map may indicate the locations and catchment areas for schools.

The ordering of the hits in listing 605 corresponds to the ordering produced by search engine 200. This in turn is generally based on relevance, which may be calculated from a variety of factors such as prominence of the search terms, number of links to the relevant material, age of material, and so on. The type of material can also be used as an indicator of importance or relevance. For example, recent emails might be treated as a primary source of information, recent local files as a secondary source of information, and public material (e.g. the Internet) as a further source of information. As noted above, in some embodiments the search domain may be restricted to only certain information sources, depending upon the application and circumstances. In some embodiments, information from different sources may be presented in a single ordering of relevance, while in other embodiments, hits from different sources may be presented on different tabs, so that one tab might be for email hits, one tab might be for hits from local files, one tab might be for hits from files across the enterprise, and so on.

In a preferred embodiment, a database is used to store a record of incoming calls, and this database also tracks any links or material used in processing the call. This material may then be given an increased relevance for handling future calls (perhaps from the same organization or calling number).

Although the invention has primarily been described in the context of inbound calls, it may also be applied in the context of outbound calls. For example, a call center may make outbound marketing or customer survey calls to a given telephone number. The agent handling the call may be provided with a screen similar to that of FIG. 6 for handling the call, so that the agent is provided with additional material such as shown on the tabs for "Hits", "News" and "Map" to supplement the standard script. As for inbound applications, this additional material may help an agent to interact with a called party at a more individual, and hence generally more successful, level.

In another outbound embodiment, a caller makes a call using speech recognition by speaking the desired target of the call (this may be a person or an organization). Search engine 200 can then search for the name and/or number of the target. The data to be searched might include: phone numbers from private directories; phone numbers from enterprise directories; phone numbers from Yellow Pages or White Pages; phone numbers from web sites; phone numbers from emails; and so on. The caller may also be provided with other information of potential relevance to the call. For example, if the target is a particular organization, e.g. a supplier, the caller might be provided with current order details from that supplier.

Figure 7:
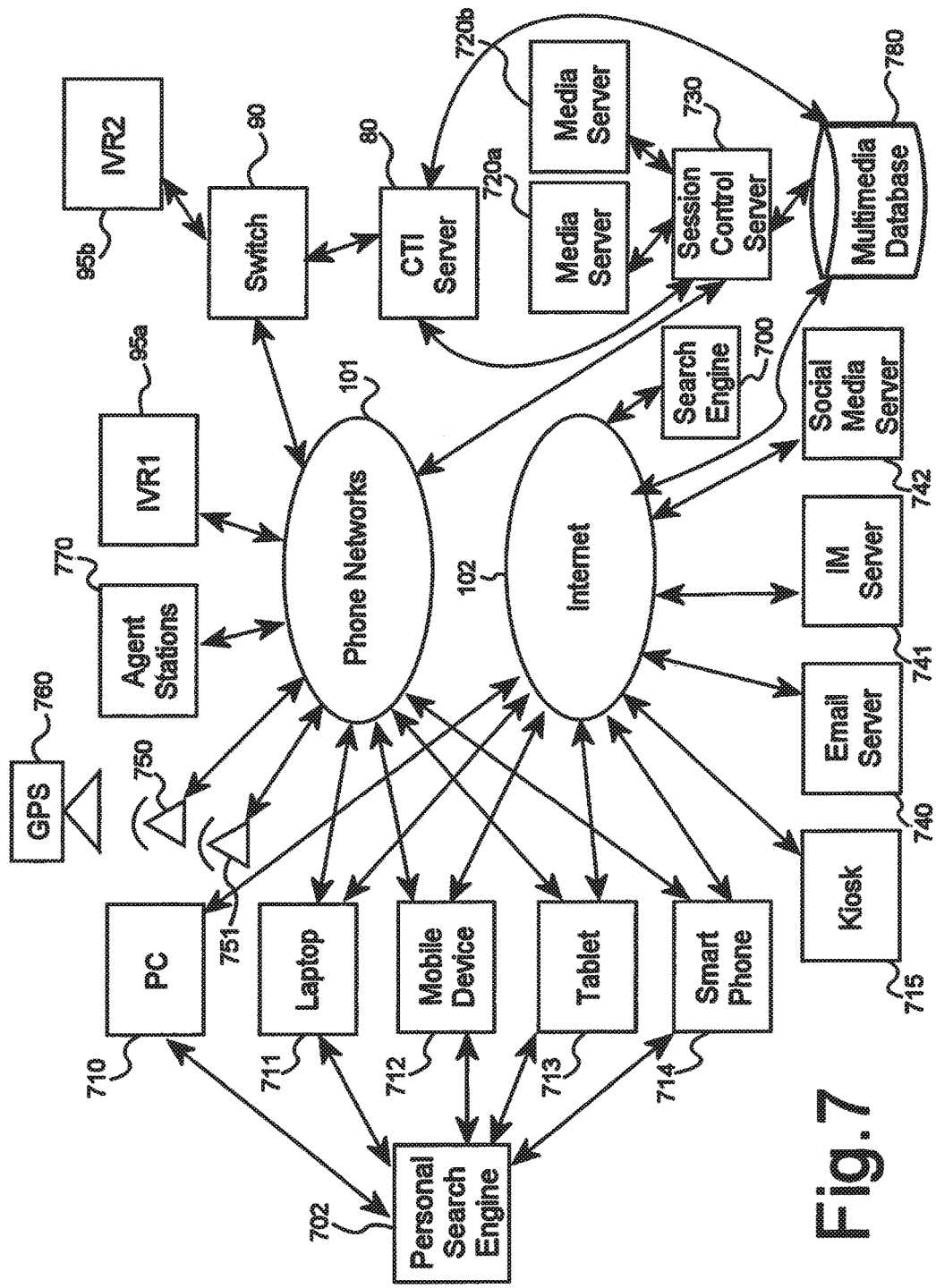
FIG. 7 is a block diagram of a preferred embodiment of the invention in which a multimedia contact center system is enhanced by use of one or more search engines.

FIG. 7 illustrates a preferred embodiment of the invention, in which one or more search engines are used to enhance operations of a multimedia contact center as conceived by the inventors. Consumers or other person wishing to interact with an enterprise operating a multimedia contact center can initiate a communications session (or receive an enterprise-initiated communications session) using a variety of communication-enabled devices. For example, in some cases personal computer 710, playing a role analogous to that of workstations 122 (but for a consumer rather than an enterprise contact center agent) in previously described embodiments, may be associated with a telephone 750 (analogous to telephones 121), and a consumer may, as before, contact or be contacted by an enterprise via a phone call to telephone 750, the phone call being carried by one or more telephone networks 101. In other cases, a consumer may use PC 710 to initiate or receive a voice-over-Internet-protocol (VoIP) phone call using a software application running on (or accessed via a browser application on) PC 710. In yet other cases, a consumer may participate in a communications session with an enterprise using instant messaging, using one of many instant messaging applications known in the art (such as Microsoft's Office Communicator or AOL™ Instant Messenger; it will be appreciated by one having ordinary skill in the art that there are many instant messaging systems well established in the art, many of which are interoperable using standards such as extensible messaging and presence protocol XMPP). One or more instant messaging servers 741, generally accessible via the Internet but possibly via other data networks, act as intermediaries for instant messaging communications, in much the same way that email servers 740 act as intermediaries for electronic mail (email). Also, it will be appreciated that consumers may choose to interact via asynchronous communications means such as emails (using one or more email servers 740) with an enterprise's multimedia contact center (indeed, the term "multimedia" when used in conjunction with terms such as "contact center" generally refers to contact centers that are adapted to allow consumers to participate in inbound or outbound communications sessions using any of, for example, email, TDM or conventional telephony, IP or Internet telephony, instant messaging, email, chat, or even video communications means). It will be appreciated by one having ordinary skill in the art of communications that consumers can use any of these using software executing on PC 710 or using telephone 750 (for conducting conventional telephony). Similarly, consumers may use laptop 721, again with or without telephone 751, as an endpoint of one or more communications sessions with an enterprise. In yet other cases, consumers may elect to communicate with (or about) an enterprise using newer communications media, such as social media (such as TWITTER™, FACEBOOK™ or GOOGLE+™), which are mediated by one or more social media servers 742 that act as signaling hubs to receive, redirect, and forward communication requests from various participants, again generally but necessarily over the Internet 102.

In addition to personal computer 710 and laptop 711, possibly supplemented by telephones 750, 751, consumers today may use a wide range of highly capable devices as endpoints for communications with enterprise multimedia contact centers. For example, mobile device 712, which could be a personal digital assistant, a "netbook", or even a wristwatch equipped with basic processing capabilities and a wireless radio, may be used as an endpoint. From mobile device 712, a consumer might send or receive emails to or from one or more email servers 740 for further transmission to an enterprise contact center (for instance, when a consumer wishes to find a status of a loan application by sending an email). Alternatively, instant messaging (mediated by one or more instant messaging servers 741) or social media (mediated by one or more social media servers 742), or VoIP telephony over Internet 102 may be used to establish or conduct communications sessions with an enterprise multimedia contact center. Similarly, tablet device 713 (such as Apple's iPad™), smart phones 714 (of which many varieties are well-known in the art), or even kiosks 715, which are generally standalone computers in public locations such as airports or retail outlets that provide at least interconnection capability to visiting consumers, may all be used as endpoints for communications between a consumer and an enterprise multimedia contact center. Moreover, each of these types of devices (and others not shown but that are or become known in the art) is usually capable of supporting more than one particular communications channel or medium, but may not support all possible channels. For instance, a tablet 713 might not be equipped with mobile telephony capabilities and thus not be able to conduct conventional telephony sessions (phone calls), but might be adapted to use VoIP and a public wireless connection to conduct telephony sessions over Internet 102 instead of a telephone network 101. Further, many mobile devices (mobile devices 712, tablets 713, smart phones 714, and even laptops 711) may be equipped with global positioning system (GPS) receiver hardware and software to enable them to receive information pertaining to a present location (or recent set of locations or trajectories) of one or more users of the mobile devices from GPS satellites 760.

The preceding paragraphs have described a wide range of communications channels, media, or modalities that are available to consumers or others (for instance, business partners) seeking to communicate with an enterprise multimedia contact center; it is fair to say that today the number of options is continually expanding, both in terms of underlying technologies (conventional telephony, VoIP telephony, video, instant messaging, email, social media, and so forth), as well as in terms of available providers (instead of one or two phone service providers, consumers now may select from several landline and mobile phone providers, a wide range of freely available email services, and so forth). These capabilities in the hands of consumers have led steadily to the use of more and more communications channels and protocols within enterprise contact centers. Not even fifteen years ago, essentially all contact centers handled one type of medium-conventional telephone calls delivered generally over a single network provider with whom the operator of the contact center had a long-term telecommunications contract—whereas today most contact centers are tasked with responding to (or reaching out to) consumers via most or all of the available communications channels those consumers might adopt.

In order to be able to handle additional media types, enterprise contact centers have become more complex. For instance, and according to a preferred embodiment of the invention, an enterprise multimedia contact center comprises one or more switches 90, sometimes deployed in a third-party hosting facility or within a telephone network, or located in one or more data centers of the enterprise, or collocated with the various contact center sites directly on an enterprise's premises. Since many consumers still choose conventional telephony to communicate with enterprises (and since today it is commonplace in the art to convert a telephone call from one of VoIP and TDM to the other as needed, either in the network or within an enterprise's premises), according to the embodiment one or more interactive voice response (IVR) units (not shown) are used to provide voice-based menus and announcements to consumers, and to accept speech input from consumers. As in the case of embodiments described with reference to FIG. 2, switch 90 is normally connected to CTI server 80, and provides notification of call-related events and updates of call-related data (usually obtained from an IVR directly, although in some embodiments an IVR is also connected to CTI server 80 and passes this information directly) to CTI server 80. In addition, as described above, CTI server 80 accesses data from multimedia database 780 to enable intelligent routing of calls and provision of caller-related data to agent workstations 770 (which are typically configured as described with reference to FIGS. 1 and 2, although in embodiments relating to multimedia contact centers, agent workstations 770 are also provided with software for acting as an endpoint (and managing) one or more of the alternative communications media such as IM, email, chat, social media, and video). While some switches 90 known in the art have been extended to become "unified communications servers", many enterprises maintain conventional telephony switches 90 and use one or more media servers 720*a*, *b* to manage non-telephony channels (and often to manage VoIP telephony as well). In most embodiments of multimedia contact centers, media servers 720*a*, *b* serve to handle low-level media details such as transcoding, encryption, packet collection and ordering, security-related features pertaining to a stream of packets constituting a communications session, handling bridging and conferencing of two or more sessions (analogous to when switch 90 merges two phone calls together or implements a conference bridge). Media servers 720*a*, *b* are in many ways analogous in function to switch 90, and in some embodiments there is no switch 90 and all voice communication sessions are either delivered as or converted to VoIP telephony sessions (that is, packetized communications sessions as opposed to circuit-based sessions, which is conventional telephony) and handled by one or more media servers 720*a*, b. In some cases, specific media servers 720*a*, *b* handle only particular media types (for instance, VoIP and IM, but not email), while in others media servers 720*a, b* are adapted to handle all permissible media types within an enterprise multimedia contact center.

In some embodiments, as described above, one or more IVRs (not shown) may be used to play pre-recorded messages to callers. In addition, in a multimedia contact center, this notion of pre-recorded messages may be extended quite naturally to comprise other forms of automated communications to consumers. Among these are, for example, predetermined email auto-response messages (possibly sent to consumers in response to a particular email subject classification or in response to a recognized query from a consumer such as "what is the status of my refund?"), automatically generated text messages sent via instant messaging server 741 or social media server 742 (or via a telephone network's 101 short messaging system), or automatically selected video clips sent via one or more streaming techniques over the Internet 102. Furthermore according to various embodiments, a number of triggering conditions or causes may be specified that act to trigger or cause the transmittal of one or more automated communications events (such as an automated email, IM, SMS, or video), including but not limited to satisfying a configured business rule based on CRM data contained in multimedia database 780. For example, a periodic query of CRM data in multimedia database 780 can be executed that detects consumers who have applied for a loan and have not yet received an update, or have not received any update in at least a specified period of time such as three days or one week, in order to create a list of consumers (and associated CRM data records) to whom one or more automated communications events are transmitted in order to provide the consumers with an update on a status of the consumer's loan application. It should be apparent to one having ordinary skill in the art that, by virtue of having a large amount of relevant consumer-specific data in multimedia database 780, it is possible for a service provider operating a multimedia contact center to provide a high-value proactive notification service to its clients.

In a preferred embodiment, session control server 730 performs a signaling and control function similar to that of CTI server 90, for instance making routing decisions such as to which agent workstation 770 to deliver a particular session or media stream. In some embodiments, session control server 730 implements a protocol known as session initiation protocol (SIP), which is well-known in the art, and which allows it to receive requests for the initiation, routing, termination, bridging, or tagging of communications sessions of any media type. While SIP is a natural and preferred protocol for handling communications with and internal functions of session control server 730, it is not necessary according to the invention, and any suitable call or session control protocol (such as call control XML or CCXML, VoiceXML, or state chart XML or SCXML) can be used alternatively. As was described above with respect to CTI server 80 in a voice call center, either CTI server 80 or session control server 730 may be adapted to retrieve CRM data from multimedia database 780 (which is a generalized version of CRM database 70, as will be described shortly). In addition to functions and data elements already described, in a multimedia contact center additional data elements may optionally be added or may be required in some embodiments. Typically, CRM records will contain more complex data pertaining to contact information for a given consumer, since instead of one or more telephone numbers (commonly for example a home phone, a work phone, and a mobile phone), CRM records may contain email addresses, instant messaging user names associated with one or more instant messaging networks, social media usernames associated with one or more social media networks, and so forth. As it has become common for one or more social media network providers to offer "open security" solutions in which a single social media network may provide account login and authentication services to a wide variety of third party services (generally as a way to increase adoption of the associated social media network), in some embodiments CRM records contain one or more central user identities that can be used to authenticate and login a given consumer into a plurality of third party communications systems and online locations. Similarly, call records are, according to multimedia contact center embodiments of the invention, adapted to capture data relevant to all applicable media types. Since different media types can accommodate very different "call flows" (sometimes referred to or considered as "call topologies" or "call structures"). For example, the word "session" can have very different meanings when used to refer to different communications channels. With phone calls, whether conventional or VoIP-based, a session is understood to mean a phone call or a set of related phone calls that occur substantially simultaneously and are related (for instance, if a consumer calls and is routed to an agent, then the agent holds the consumer and makes a short call to another, more expert, agent, then there will be within switch 90 two "calls", but generally CTI server 80 would consider them to be part of one "session"). In contrast, email "conversations" or "threads" (that is, a sequence of related emails between two or more parties, often over a protracted period of time, that are about one particular topic or transaction) are often considered to comprise a single "session". In the first (phone call) case, all sub-sessions or components of a session occur "at one sitting"—they take place within a single span of time, usually with at least one active throughout the applicable span, such that when the last active call of a given session is terminated, the session is considered terminated, and any new call that might be between the same parties would be considered a new session; in the second case, sessions may be comprised of many sub-sessions or components that occurred over a potentially long period of time. Call records can be maintained, according to the embodiment, either a single table of complex data structures representing each session in whatever way is best suited for its particular media type (note that, in some embodiments, sessions may even be composed of multiple sub-sessions that comprise different media types, in what are known as the art as "multimodal" communications scenarios), or in a set of distinct tables, each designed to handle session records (a generalization of switch 90-derived call records) for a specific media type or group of related media types.

According to a preferred embodiment, a multimedia contact center as just described is enhanced through use of search engines 700-702, in much the same way as a conventional telephony call center was enhanced as described with reference to FIGS. 2-6. Search engine 700 comprises one or more network-resident, generally publicly accessible search engines such as Google (although search engine 700 in some embodiments may comprise a proprietary search engine such as a consumer credit-related search engine). Search engine 701 is an enterprise search appliance or server used analogously with search engine 200, and search engine 702 is a desktop or personal search engine analogous to search engine 508, although in some embodiments a search scope of search engine 702 extends across a plurality of data-containing devices associated with a particular user (such as one or more PCs 710, laptops 711, mobile devices 712, tablet devices 713, smart phones 714 and even possibly personal kiosks 715). This search engine 702 is, in some embodiments, adapted to search several devices associated with a given user (or indeed with a given group of users, including a group of users defined dynamically at the moment of a search, in which case search engine 702 would be provided with a target or address list specifying a search domain to use when conducting a specific search).

The skilled person will be aware of a range of possible modifications of the various embodiments described above. Accordingly, the present invention is defined by the claims and their equivalents.

What is claimed is:

1. A method of operating a multimedia contact center, the method comprising the steps of:
    (a) receiving a communications session;
    (b) obtaining media information relating to the communications session;
    (c) sending a plain text search request by a computer-telephony system from a contact center system to a third-party non-relational Internet search engine and to an enterprise non-relational search engine that performs a search across multiple servers of an enterprise organization to perform two or more searches based at least on the media information;
    (d) receiving a set of relevance-ranked search results from each of the requested searches; and
    (e) using the relevance-ranked sets of search results to automatically route the communications session to a contact center agent;
    wherein two or more searches are performed using data from a single communications session.

2. The method of claim 1, wherein the set of relevance-ranked search results are used to provide information to at least one participant of the communications session.

3. The method of claim 1, wherein the set of relevance-ranked search results are used to determine an advertisement to be delivered via the communications session to at least one participant of the communications session.

4. A method of operating a multimedia contact center, the method comprising the steps of:
    (a) initiating a communications session from a contact center system targeted at a specific consumer;
    (b) providing, from the contact center system, information relating to the communications session to a third-party non-relational Internet search engine as a plain-text search query;
    (c) providing, from the contact center system, information relating to the communications session to an enterprise non-relational search engine that performs a search across multiple servers of an enterprise organization as a plain-text search query;
    (d) receiving a set of relevance-ranked search results from each of the search queries; and
    (e) using the sets of relevance-ranked set of search results to automatically route the communications session to a contact center agent;
    wherein two or more searches are performed using data from a single communications session.

5. The method of claim 4, wherein the provided information comprises an identity of the target of the communications session.

6. The method of claim 4, wherein the sets of relevance-ranked search results are used to determine an advertisement to be delivered via the communications session to at least one participant of the communications session.

* * * * *